Feb. 18, 1958  H. W. SEMAR ET AL  2,823,558
GEARING APPARATUS
Filed March 4, 1955
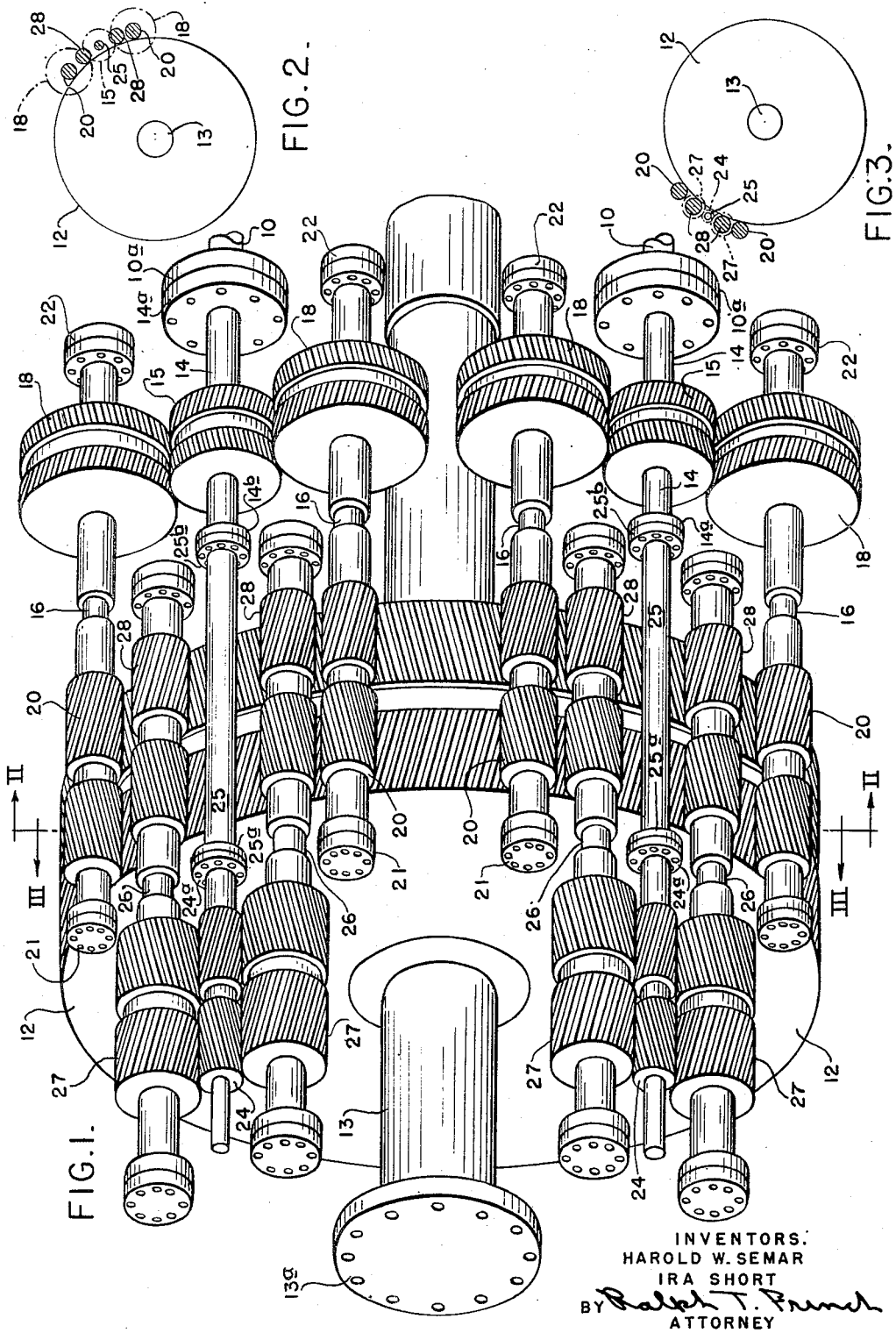
INVENTORS.
HAROLD W. SEMAR
IRA SHORT
BY Ralph T. French
ATTORNEY

United States Patent Office 2,823,558
Patented Feb. 18, 1958

2,823,558

GEARING APPARATUS

Harold W. Semar, Drexel Hill, and Ira Short, Prospect Park, Pa., assignors to Westinghouse Electric Corporation, East Pittsburgh, Pa., a corporation of Pennsylvania Application March 4, 1955, Serial No. 492,274

3 Claims. (Cl. 74—665)

This invention relates to a reduction gearing arrangement, more particularly to a gearing arrangement for a marine installation in which one or several turbines or other prime movers drive a propeller shaft through a common speed reduction gear unit, and has for an object to provide a compact and improved gearing of this type.

Marine prime movers, for example high speed steam turbines are being designed to provide increasingly more and more power to the propulsion apparatus. With heretofore known reduction gearing, the gearing elements for driving the low speed gear would attain excessive dimensions and weight which is highly undesirable, since space in a ship is limited and since such large gearing increases the expense of the propulsion unit.

Accordingly, it is another object of the invention to provide a high power marine propulsion unit comprising a common speed reduction gear unit, in which the diameters of the pinions and gears are maintained within conventional limits without excessive tooth loading factors.

A more specific object is to provide a marine propulsion unit in which the input shaft power from each prime mover is divided into quarters in a simple and unique manner before application to the low speed gear.

These and other objects are effected by the invention as will be apparent from the following description taken in connection with the accompanying drawings, forming a part of this application, in which:

Fig. 1 is a perspective view of a reduction gearing unit illustrating the invention;

Fig. 2 is a diagrammatic sectional view, on a reduced scale, taken on line II—II of Fig. 1; and Fig. 3 is a diagrammatic sectional view taken on line III—III of Fig. 1.

Referring to the drawings in detail, especially Fig. 1, there are shown a pair of high speed driving shafts 10 connected to separate high speed turbines or the like (not shown) for driving low speed gear 12 through separate sets of reduction gearing, in accordance with the invention, and hereafter to be described in detail. As well known in the art, the low speed gear 12 may be suitably journaled in a pedestal not shown and is provided with a driving shaft 13 having a flange 13a for attachement to propulsion apparatus, for example, the propeller of a ship (not shown).

Since, in accordance with the invention, the gearing between each of the high speed shafts 10 and the low speed gear 12 may be identical, only one set of gearing will be described.

The high speed shaft 10 is attached to a high speed shaft extension 14 by mutually cooperating couplings 10a and 14a, respectively, carried thereon. The high speed shaft extension 14 has mounted thereon and rigidly attached thereto a high speed pinion 15 disposed on one side of the low speed gear 12. A pair of intermediate speed shafts 16 are disposed on opposite sides of the high speed shaft 14 and are provided with intermediate speed gears 18, 18 in meshing engagement with the high speed pinion 15. The intermediate speed shafts 16, 16 extend across the face of the low speed gear and have attached thereto intermediate speed pinions 20, 20 disposed in meshing engagement with the low speed gear. Suitable couplings 21, 22 may be provided on each of the intermediate speed shafts for attaching the pinions 20 and the gears 18 thereto, as well known in the art.

As thus far described, the gearing arrangement is somewhat conventional and is known as the "double reduction locked train." With this arrangement, the power transmitted by the high speed driving shaft 10 is divided in two parts by the high speed pinion 15 and transmitted to the low speed gear 12 by the intermediate pinons 20, 20.

In accordance with the invention, a high speed pinion 24 is connected to the high speed shaft extension 14 by means of an elongated coupling member 25. The coupling member 25 is provided with coupling flanges 25a and 25b connected to mutually cooperating flanges 24a and 14b provided on the high speed pinion 24 and on the high speed shaft extension 14, respectively. The high speed pinion 24 is disposed on the side of the low speed gear opposite to that of the high speed pinion 15. Suitable bearings (not shown) may be provided, as well known in the art.

A pair of intermediate speed shafts 26, 26 disposed on opposite sides of the high speed pinion 24 are provided with an intermediate speed gears 27, 27 in meshing engagement with the high speed pinion 24. The intermediate speed shafts 26, 26 are further provided with intermediate speed pinions 28, 28 in meshing engagement with the low speed gear 12. The pinions 28, 28 may be formed with pitch diameters identical to those of intermediate speed pinions 20, 20.

The high speed pinion 24 is of smaller pitch diameter than the high speed pinion 15. Similarly, the intermediate speed gears 27, 27 are of proportionately smaller pitch diameter than the intermediate speed gears 18, 18 and, in accordance with the invention, are designed in such a manner that the total gear ratio between the high speed pinion 24 and the low speed gear 12 is the same as the total gear ratio between the high speed pinion 15 and the low speed gear 12. With this arrangement, the intermediate speed pinions 28, 28 are disposed adjacent and on opposite sides of the high speed coupling member 25 in a zone heretofore unoccupied, thereby providing a compact arrangement which, as seen in Fig. 2, occupies no more cross sectional area than heretofore occupied by the conventional "double reduction locked train" gearing unit.

In operation, the high speed pinion 24 and the high speed pinion 15 are driven directly by the turbine shaft 10 and the intermediate speed pinions 28, 28 are driven by the intermediate speed gears 27, 27. It will now be seen that the total power from the turbine shaft 10 is divided equally among each of the four intermediate speed pinions 20, 20 and 28, 28. That is, each of the intermediate speed pinions assumes one-fourth of the load on the low speed gear 12.

With this arrangement, the tooth-loading on all of the gears and pinions is reduced by 50%. For example, the tooth load on the high speed pinion 15 is divided by two, since one-half of the loading on the high speed shaft is assumed by the high speed pinion 24. Similarly, the tooth-loading on the intermediate speed pinions 20, 20 is divided by two, since half of the load is assumed by the intermediate speed pinions 28, 28. With reduced tooth-loading factors (assuming a fixed horsepower output at the high speed driving shaft 10) all of the gear members and pinions may be made of smaller dimensions. Conversely, with doubled power input at the driving shaft 10, the dimensions of the gearing and pinions need be no larger than that heretofore found necessary with the "double reduction" gearing unit.

As shown in Figs. 2 and 3, wherein the reduction gearing from the high speed driving shaft of one turbine is shown, it will be noted that sufficient space remains on the periphery of the low speed gear 12 to accommodate several other sets of reduction gearing in accordance with the invention. In Fig. 1, the two sets of reduction gearing occupy one half of the periphery of the low speed gear.

The compactness of the gearing arrangement described is highly advantageous in ship propulsion apparatus, since it permits the harnessing of extremely high power turbines to the low speed gear of the propulsion apparatus in a simple and compact manner without exceeding restricted space limitations on board ship.

The invention also provides a highly durable gearing arrangement and is expected to minimize overhauling after installation and to give long and steady service chiefly because of the reduced tooth-loading values achieved thereby.

While we have shown our invention in but one form, it will be obvious to those skilled in the art that it is not so limited, but is susceptible of various changes and modifications without departing from the spirit thereof.

What is claimed is:

1. In gearing, the combination of a low speed gear wheel, a high speed driving shaft extending transversely of the face of said gear wheel, said driving shaft having a pair of high speed pinions fixed thereto of different pitch diameters and disposed on opposite sides of said low speed gear wheel, first and second pairs of intermediate speed pinions of identical pitch diameters disposed in driving engagement with said low speed gear wheel, first gear means for transmitting power from one of said high speed pinions equally to said first pair of intermediate speed pinions and second gear means for transmitting power from the other of said high speed pinions equally to said second pair of intermediate speed pinions, whereby each of said intermediate speed pinions transmits one quarter of the power output of the high speed driving shaft to said low speed gear wheel.

2. In gearing, the combination of a low speed gear wheel, a high speed driving shaft extending transversely of the face of said gear wheel and having a pair of high speed pinions attached thereto and disposed on opposite sides of said low speed gear, and two pairs of intermediate speed pinions disposed in driving relation with said low speed gear wheel, one of said pairs of intermediate speed pinions being in driven relation with one of said high speed pinions and the other of said pairs of intermediate speed pinions being in driven relation with the other of said high speed pinions, the one of said high speed pinions being of different pitch diameter than the other of said high speed pinions and the total gear ratios between each of said high speed pinions and said low speed gear being identical.

3. In gearing, the combination of a low speed gear wheel, a pair of high speed driving shafts disposed in spaced parallel relation to each other and extending transversely of the face of said gear wheel; each of said driving shafts having a pair of high speed pinions attached thereto and disposed on opposite sides of said low speed gear, and two pairs of intermediate speed pinions disposed in driving relation with said low speed gear wheel, one of said pairs of intermediate speed pinions being in driven relation with one of said high speed pinions and the other of said pairs of intermediate speed pinions being in driven relation with the other of said high speed pinions, the one of said high speed pinions being of different pitch diameter than the other of said high speed pinions and the total gear ratios between each of said high speed pinions and said low speed gear being identical.

References Cited in the file of this patent

UNITED STATES PATENTS

| | | |
|---|---|---|
| 1,351,317 | Alquist | Aug. 31, 1920 |
| 1,351,318 | Alquist | Aug. 31, 1920 |